(12) United States Patent
Eikhoff et al.

(10) Patent No.: US 6,978,544 B1
(45) Date of Patent: Dec. 27, 2005

(54) METHOD OF SECURING ORNAMENTATION TO A WHEEL USING A RETAINING ARTICLE

(75) Inventors: Ted E. Eikhoff, Grosse Pointe, MI (US); Douglas J. Cutcher, Bloomfield Hills, MI (US); Ted J. Wieczorek, Rochester Hills, MI (US)

(73) Assignee: McKechnie Vehicle Components (USA), Inc., Troy, MI (US)

( * ) Notice: Subject to any disclaimer, the term of this patent is extended or adjusted under 35 U.S.C. 154(b) by 0 days.

(21) Appl. No.: 10/123,499

(22) Filed: Apr. 16, 2002

Related U.S. Application Data

(62) Division of application No. 09/668,653, filed on Sep. 22, 2000, now Pat. No. 6,402,254.

(51) Int. Cl.$^7$ ............................................. B23P 15/00
(52) U.S. Cl. ............................. 29/894.381; 29/894.38; 29/896.6
(58) Field of Search ..................... 29/894.38, 894.381, 29/896.6, 428; 206/304; 301/108.1, 108.4, 37.31, 37.32, 37.102, 37.371, 37.372, 37.373

(56) References Cited

U.S. PATENT DOCUMENTS

| | | | |
|---|---|---|---|
| 2,552,919 A | * | 5/1951 | Becker |
| 2,576,683 A | * | 11/1951 | Horn |
| 3,970,346 A | | 7/1976 | Kretschmer |
| 5,163,739 A | | 11/1992 | Stanlake |
| 5,249,845 A | | 10/1993 | Dubost |
| 5,297,854 A | | 3/1994 | Nielsen et al. |
| 5,520,445 A | | 5/1996 | Toth |
| 5,842,749 A | | 12/1998 | DiMarco |
| 5,988,764 A | | 11/1999 | Deetz |
| 6,017,096 A | | 1/2000 | Russell |
| 6,238,007 B1 | | 5/2001 | Wieczorek et al. |
| 6,402,254 B1 | | 6/2002 | Eikhoff et al. |

FOREIGN PATENT DOCUMENTS

EP 0 497 655 B1 7/1994

* cited by examiner

Primary Examiner—I Cuda Rosenbaum
(74) Attorney, Agent, or Firm—Butzel Long

(57) ABSTRACT

A retaining assembly secures ornamentation having an inboard surface and a plurality of protrusions to a wheel. The retaining assembly includes a ring. The ring includes a plurality of openings extending therethrough. The openings receive protrusions that extend out from the ornamentation. Legs extend out from the ring and engage multiple sides of a portion of the lug nuts. This secures the ornamentation to the wheel hub. The retaining assembly also includes supports that are secured between the legs. The supports provide support and prevent over-travel of the legs when the ornamentation is being installed by securing the ring to the lug nuts. The supports include an extension and a cross member. The extension positions the supports with respect to the ring and the cross members are bent and welded to the legs that are disposed adjacent thereto to provide support and prevent the over-travel of the legs as the legs pass over the lug nuts to which they are being secured.

20 Claims, 3 Drawing Sheets

METHOD OF SECURING ORNAMENTATION TO A WHEEL USING A RETAINING ARTICLE

CROSS-REFERENCE TO RELATED APPLICATION(S)

The present application is a divisional application of U.S. patent application Ser. No. 09/668,653, filed Sep. 22, 2000 now U.S. Pat. No. 6,402,254.

BACKGROUND OF THE INVENTION

1. Field of the Invention

The present invention relates to ornamentation for vehicular wheels. More specifically, the present invention relates to a retaining article for wheel caps and covers to secure them to the vehicular wheels.

2. Description of the Related Art

Wheel ornamentation, such as wheel caps and covers (hereinafter "wheel covers") are aesthetic devices used to enhance the look of the wheels to which they are attached. Wheel covers are used because the manufacture, finish and mounting of a wheel cover to a wheel is less expensive than manufacturing a wheel having the same quality finish of a wheel cover. A chrome surface on a wheel cover is an inexpensive alternative to a chrome plated or polished wheel. In addition, wheel covers provide various types of appearances and styling variations, all of which may be combined with a single wheel design. The desirability of wheel covers is, however, directly proportional to the ability to inexpensively attach the wheel covers to the wheel permanently while adding little weight to the overall composite wheel.

U.S. Pat. No. 5,297,854, issued to Nielson et al. on Mar. 29, 1994, discloses a wheel cover retention system which incorporates a plurality of retainers secured to the wheel cover when it is mounted to a hollow protrusion extending out from the inboard surface of the wheel cover. The retainers receive lug nuts, which hold the wheel in place. This system of wheel cover retention is undesirable because each retainer is an element independent of the other retainers. Inventory costs and assembly costs increase with so many parts, which fabricate a retention system.

U.S. Pat. No. 5,695,257, issued to Wright et al. on Dec. 9, 1997, discloses a retention system for a wheel cover. This system includes a ring having a number of attachments secured thereto allowing the wheel cover and the wheel to be attached to the ring keeping the wheel cover secured to the wheel. This system relies on bolts, nuts and attachment brackets. This system is undesirable because there are several parts to the system, which require alignment and threading, and the system is cumbersome to install and remove from the wheel. More specifically, for a user to access the wheel, the user must unbolt the four bolts, which are shown holding the wheel cover to the ring and the four nuts shown securing the ring to the wheel. This task is tedious and undesirable.

SUMMARY OF THE INVENTION

A retaining assembly secures ornamentation to a wheel. The ornamentation includes an inboard surface defining a plurality of protrusions. The wheel is secured to a wheel hub with a plurality of lug nuts. The retaining assembly includes a ring defining an outer ring periphery and an inner ring periphery. The ring further includes a plurality of openings extending therethrough between said inner and outer peripheries for receiving each of the plurality of protrusions of the wheel cover. A plurality of legs extends out from the ring to engage multiple sides of a portion of the lug nuts to secure the ornamentation to the wheel hub. Supports are fixedly secured to the plurality of legs therebetween to provide support and prevent over-travel of the plurality of legs upon installation of the retaining assembly onto the lug nuts.

One advantage associated with the invention is the ability to secure ornamentation to a wheel of a motor vehicle. Another advantage associated with the invention is the ability to secure ornamentation to a wheel using a single element or article. Yet another advantage associated with the invention is the ability to secure the ornamentation to the wheel using a single element thus reducing the assembly time. Still another advantage associated with the invention is the ability to secure ornamentation to a wheel using a single element in a manner such that the orientation of the retaining element is predisposed eliminating any requirements for alignment or orientation. Still another advantage associated with the invention is the ability to secure ornamentation to a wheel without harming the legs used to secure the retaining assembly to the wheel by preventing over-travel of the legs.

BRIEF DESCRIPTION OF THE DRAWINGS

Other advantages of the invention will be readily appreciated, as the same becomes better understood, by reference to the following detailed description when considered in connection with the accompanying drawings, wherein.

DETAILED DESCRIPTION OF THE PREFERRED EMBODIMENTS

Figure 1:
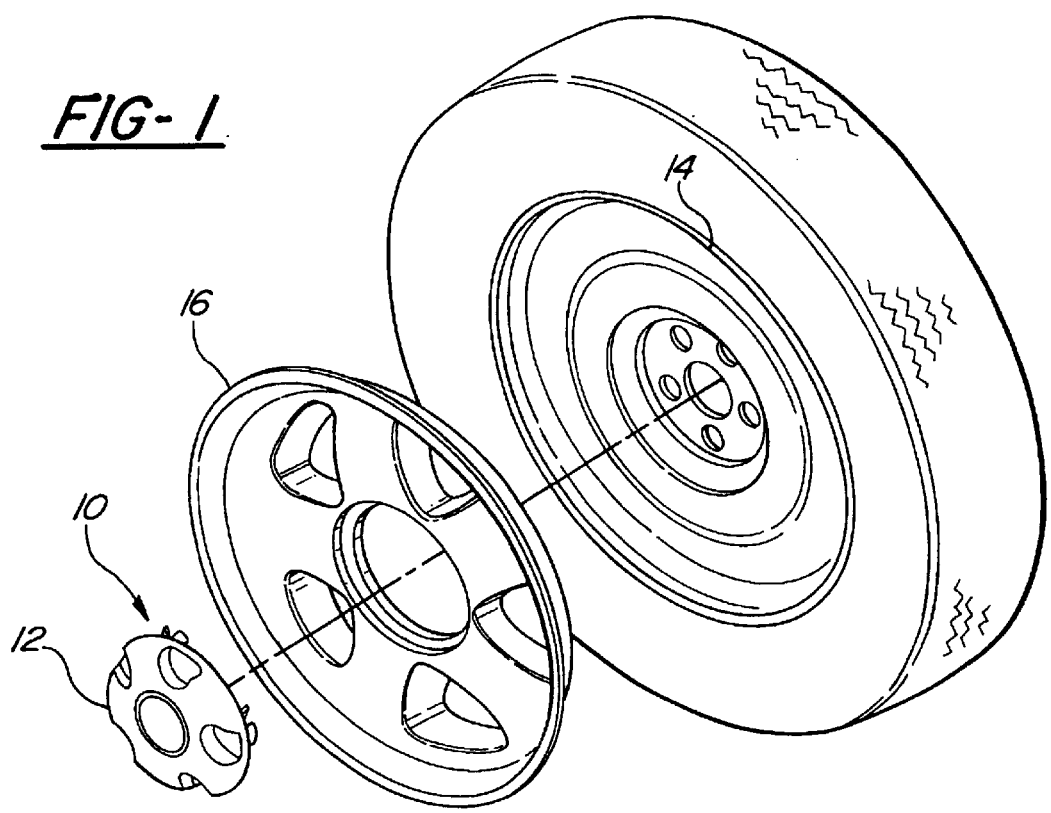
FIG. 1 is an exploded perspective view of a wheel cover and a wheel cap.

Referring to the Figures, a retaining assembly is generally indicated at 10. The retaining assembly 10 is a unitary structure that retains ornamentation, generally indicated at 12, to a wheel 14. In the embodiment shown, the ornamentation 12 is a wheel cap. It should be appreciated by those skilled in the art that the retaining assembly 10 could be adapted to be used with other wheel ornamentation such as a wheel cover 16. The wheel 14 is secured to a wheel hub 18 with lug nuts 20 which threadingly engage lug studs 22. The lug nuts 20 include a ridge 24 and a recess 26.

The wheel cap 12 defines an outboard surface 28 and an inboard surface 30. Holes may extend between the outboard 28 and inboard 30 surfaces depending on the venting and aesthetic requirements. Typically, the outboard surface 28 is finished in a manner suitable for viewing by persons outside the motor vehicle to which the wheel cap 12 is attached. In many instances, it matches the appearance of the wheel cover 16.

Extending out from the inboard surface 30 are a plurality of protrusions 32. In the embodiment shown, the protrusions 32 are cylindrical in shape defining an outer protrusion surface 34 and an inner protrusion surface (not shown). Depending on the material used to fabricate the wheel cap 12, the thickness of a wall 38 defined by the material between the outer 34 and inner protrusion surfaces of the protrusions 32 can only be approximately forty to fifty percent of the thickness of the wheel cap 12 between the inboard surface 30 and the outboard surface 28. If the thickness of the wall 38 is greater, it will create recesses in the outboard surface 28 detracting from the aesthetic quality of the outboard surface 28. Stop flanges 40 extend out from the wall 38 and will be discussed in greater detail subsequently.

Figure 2:
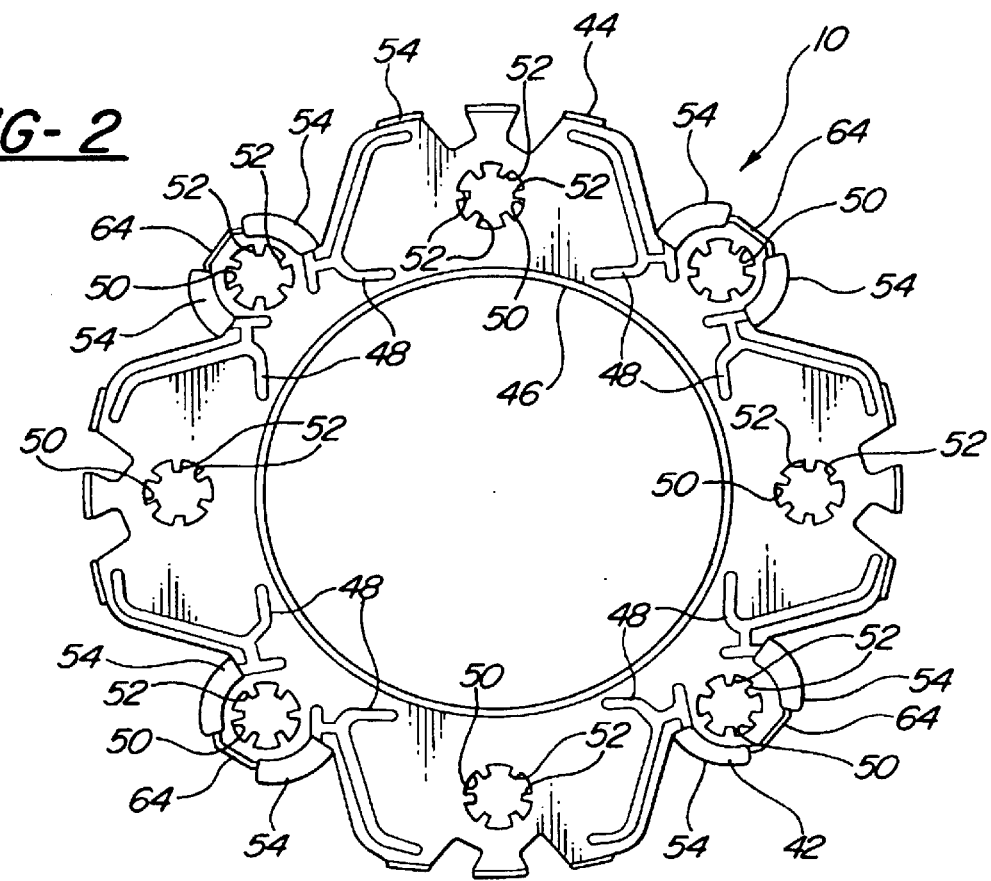
FIG. 2 is a top view of one embodiment of the invention.
Figure 3:
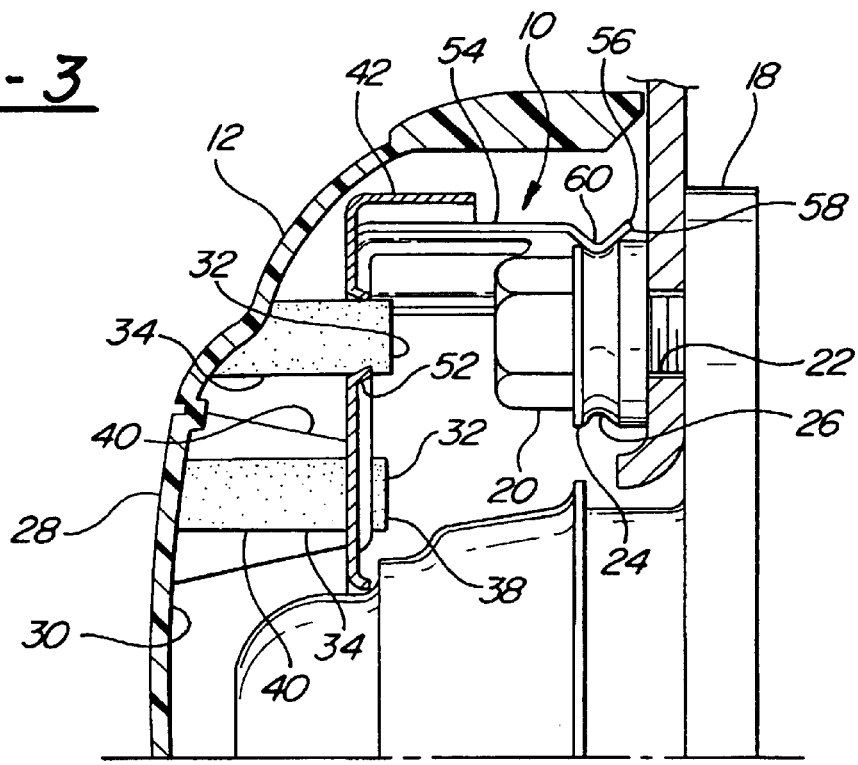
FIG. 3 is a cross-sectional side view partially cut away of one embodiment of the invention securing a wheel cap to a wheel.

The retaining assembly 10 includes a ring 42, best seen in FIG. 2. The ring 42 defines an outer ring periphery 44 and an inner ring periphery 46. The edges of the ring 42 are bent under to increase the strength of the ring 42 while minimizing sharp edges. A ring structural bend 48 extends around much of the ring 42 to aid in the strengthening of the ring 42.

The ring 42 includes a plurality of openings 50. The plurality of openings 50 receive the plurality of protrusions 32 therethrough locking the wheel cap 12 to the retaining assembly 10. A number of tabs 52 extend into the openings 50. The tabs 52 extend radially inwardly with respect to each of the openings 50. The tabs 52 are spaced along the periphery of the openings 50 and will frictionally engage the outer protrusion surface 34 of the protrusions 32. The protrusions 32 bend the tabs 52 locking the wheel cap 12 to the retaining assembly 10. The ring 42 is forced over the protrusions 32 until it abuts the stop flanges 40. This abutment positions the ring 42 with respect to the lug nuts 20 to which the ring 42 will be secured.

Extending downwardly or outwardly from the ring 42, the retaining assembly 10 includes a plurality of legs 54. The legs 54 extend out from the ring 42 and engage a portion of the lug nuts 20. Each of the legs 54 is spring biased inwardly to resiliently engage the lug nuts 20 such that the retaining assembly 10, and hence, the wheel cap 12, are secured to the wheel 14. Each of the legs 54 includes an outwardly extending distal end 56, which aids in the receipt of the lug nuts 20 into the retaining assembly 10. Each of the legs 54 is in a group of legs associated with a single lug nut 20. In the preferred embodiment, there are two legs 54 for each location that is to be secured to a lug nut 20. Only two legs 54 per lug nut 20 are needed because the ring 42 is treated as a whole. Thus, the two legs 54 that engage the outer portion of the first lug nut 20 are counteracted by two other legs 54 that engage the outer portion of a second lug nut 20 diametrically opposed to the first lug nut 20. This reduces the number of legs 54 required to retain a wheel cap 12 to a wheel 14 and provides a more true or centered alignment.

Each of the legs 54 includes a relief 58, which receives the ridge 24 on the lug nut 20. Disposed adjacent the relief 58, each of the legs 54 includes an indentation 60 which engages a recess 26 on the lug nut 20. It is the contact between the indentation 60 and the recess 26 that secures the wheel cap 12 to the wheel 14 through the retaining assembly 10.

Also extending outwardly or downwardly from the ring 42 are a plurality of supports 64. The plurality of supports 64 are fixedly secured between the plurality of legs 54. The supports 64 support the legs 54. In addition, the supports 64 prevent the legs 54 from extending outwardly to the point where the legs 54 are harmed or damaged upon the installation thereof. When a leg 54 is extended beyond its resilient capacity, it is referred to as over-travel. Over-travel weakens the legs 54 and is prevented through the incorporation of the supports 64 into the ring 42.

Each of the supports 64 includes an extension 66. The extension 66 is connected to the outer ring periphery 44 of the ring 42. The supports 64 are located between each of the two legs 54. Therefore, an extension 66 extends out from the outer ring periphery 44 between each of the legs 54 extending out from the outer ring periphery 44.

Each of the supports 64 further includes a cross member 68 that extends generally perpendicularly to the extension 66 at the end thereof. Before the ring 42 is completely formed (FIG. 4), the extension 66 and the cross member 68 form the shape of a letter "T." A cross member 68 defines a transverse body 70 having two ends 72. It is the transverse body 70 of the cross member 68 that is fixedly secured to the end of the extension 66. As should be appreciated by those skilled in the art, the extension 66 and cross member 68 are formed from a unitary structure. In the preferred embodiment, the supports 64 are stamped out of the same material as that of the ring 42.

Figure 5:
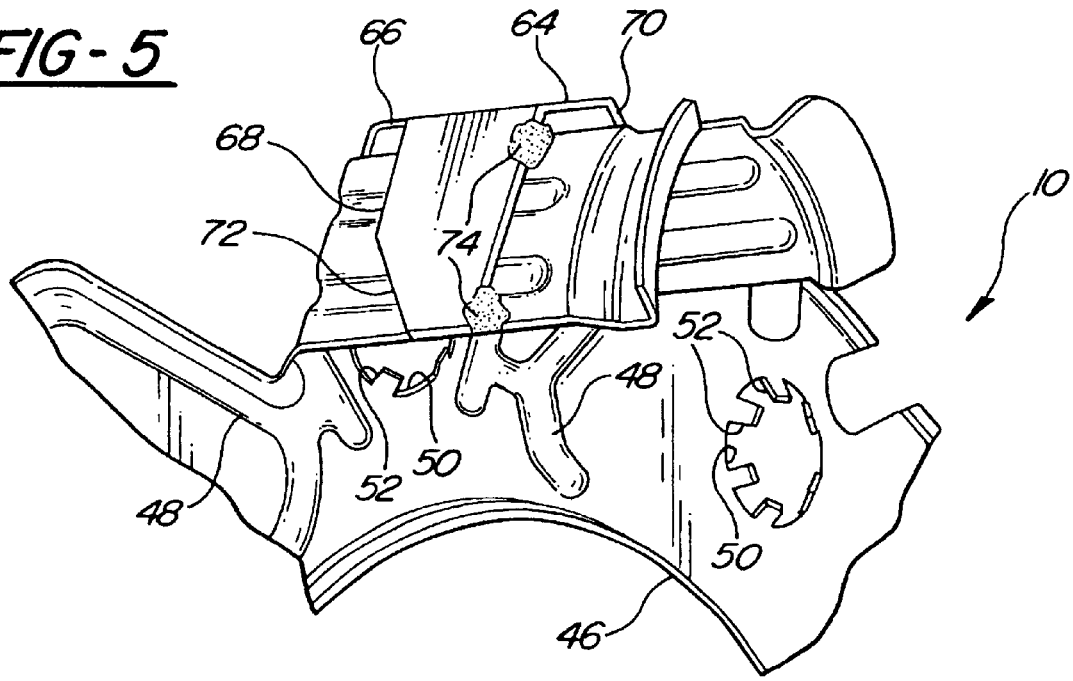
FIG. 5 is a perspective view, partially cut away, of one embodiment of the invention.

The two ends 72 of the cross member 68 are secured to the legs 54. Referring to FIG. 5, it should be appreciated that the cross member 68 is bent in two locations so that it can be secured to the two legs 54 disposed adjacent thereto. In the preferred embodiment, the two ends 72 are welded to the legs 54. It should be appreciated by those skilled in the art that any other type of securing, i.e., bonding, riveting, bolting, and the like, may be used when securing the two ends 72 to the legs 54.

Figure 4:
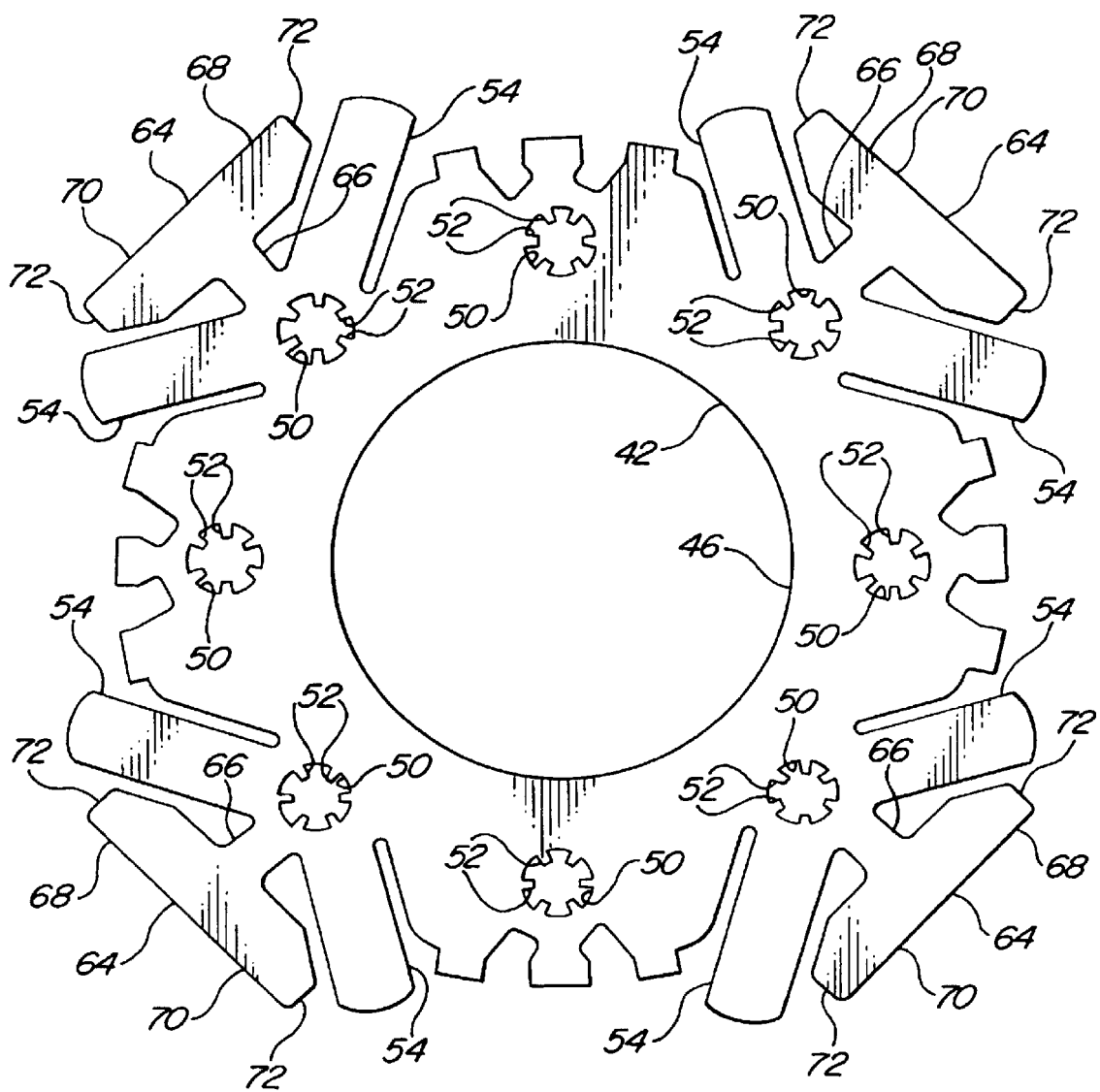
FIG. 4 is a top view of a cut piece of sheet metal used to form one embodiment of the invention.

The method for securing the wheel cap 12 to the wheel 14 using the retaining assembly 10 includes the step of stamping a piece of sheet metal to form a ring 42 having a plurality of openings 50. This form is shown in FIG. 4. The ring 42 is then cut and portions of the ring 42 are bent downwardly to create the plurality of legs 54 and supports 64 which extend out from the ring 42 in a generally parallel direction with respect to the ring 42. Structural bends 48 are pressed into the ring 42 to increase the strength thereof. The legs 54 are bent such that they are able to receive lug nuts 20 therein when the retaining assembly 10 is secured to the wheel 14. The supports 64 are bent similar to the legs 54 so that they are disposed adjacent to each other. Then, the cross member 68 is bent in two places so that the two ends 72 thereof are abutting the legs 54. The two ends 72 are then secured to the legs 54. In the preferred embodiment, the method of securing is by welding. The weld occurs along the legs 54 below the distal ends 56 to maintain the resiliency of the legs 54.

The legs 54 are then forced over the lug nuts 20, used to secure the wheel 14 to the wheel hub 18, to secure the retaining assembly 10 to the wheel 14.

The present invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the present invention may be practiced other than as specifically described.

What is claimed is:

1. A method for securing ornamentation to a wheel using a retaining article, said method comprising the steps of:

forming a ring having an inner side and an outer side;

bending portions of the ring to create a plurality of legs extending perpendicular from the inner side of the ring and generally parallel to one another;

bending extensions of the ring to create supports for the legs;

attaching a wheel ornamentation to the outer side of ring; and attaching the ring to a wheel via the legs.

2. A method as set forth in claim 1 including the step of flexing the extensions such that ends thereof are disposed adjacent the legs.

3. A method as set forth in claim 1 including the step of fixedly securing the ends of the extensions to the legs.

4. A method as set forth in claim 3 wherein said step of fixedly securing includes the stop of welding.

5. A method as set forth in claim 1 including the step of stamping structural bends therein to strengthen the ring.

6. A method as set forth in claim 1 including the step of forming a plurality of openings in the ring.

7. A method as set forth in claim 6 including the step of forcing a portion of the ornamentation into each of the openings.

8. A method as set forth in claim 1 including the step of bending the legs to receive lug nuts when the retaining article is secured to a wheel.

9. A method as set forth in claim 1 including the step of securing the retaining article to the wheel by forcing each of the legs over lug nuts used to secure the wheel to a wheel hub.

10. A method as set forth in claim 1 wherein said step of forming comprises stamping a piece of sheet metal to form the ring.

11. A method as set forth in claim 6 including the step of stamping protrusions into each of the openings.

12. A method as set forth in claim 10 including the step of cutting the ring.

13. A method for securing ornamentation to a wheel using a retaining article, the method comprising the steps of:

stamping a piece of sheet metal to form a ring having an inner side, and outer side and a plurality of openings;

cutting the ring;

bending portions of the ring to create a plurality of legs extending pendicular from the inner side of the ring and generally parallel to one another;

bending extensions of the ring to create supports for the legs;

attaching a wheel ornamentation to the outer side of the ring; and attaching tile ring to a wheel via the legs.

14. A method as set forth in claim 13 including the step of flexing the extensions such that ends thereof are disposed adjacent the legs.

15. A method as set forth in claim 13 including the step of fixedly securing the ends of the extensions to the legs.

16. A method as set forth in claim 15 wherein said step of fixedly securing includes the step of welding.

17. A method as set froth in claim 13 including the step of stamping structural bends therein to strengthen the ring.

18. A method as set forth in claim 13 including the step of forcing a portion of the ornamentation into each of the openings.

19. A method as set forth in claim 13 including the step of bending the legs to receive lug nuts when the retaining article is secured to a wheel.

20. A method for securing ornamentation to a wheel using a retaining article, the method comprising the steps of:

stamping a piece of sheet metal to form a ring having an inner side, and outer side and a plurality of openings;

cutting the ring;

bending portions of the ring to create a plurality of legs extending perpendicular from the inner side of the ring and generally parallel; to one another;

bending extensions of the ring to create supports for the legs;

flexing the extensions to create cross members defining ends;

welding each of the ends to each of the legs;

attaching a wheel ornamentation to the outer side of the ring; and attaching the ring to a wheel via the legs.

* * * * *